US012190779B2

(12) United States Patent
Hashempour et al.

(10) Patent No.: US 12,190,779 B2
(45) Date of Patent: Jan. 7, 2025

(54) DISPLAY SYSTEM WITH GLOBAL EMISSION AND METHOD FOR LUMINANCE CONTROL THEREOF

(71) Applicant: MICLEDI MICRODISPLAYS BV, Leuven (BE)

(72) Inventors: Hamidreza Hashempour, Herent (BE); Robbie Thielemans, Nazareth (BE); Soeren Steudel, Herent (BE)

(73) Assignee: MICLEDI MICRODISPLAYS BV, Leuven (BE)

(*) Notice: Subject to any disclaimer, the term of this patent is extended or adjusted under 35 U.S.C. 154(b) by 0 days.

(21) Appl. No.: 18/061,102

(22) Filed: Dec. 2, 2022

(65) Prior Publication Data

US 2023/0186821 A1 Jun. 15, 2023

(30) Foreign Application Priority Data

Dec. 9, 2021 (EP) .................................... 21213331

(51) Int. Cl.
*G09G 3/20* (2006.01)
*G09G 3/32* (2016.01)

(52) U.S. Cl.
CPC ............ *G09G 3/2085* (2013.01); *G09G 3/32* (2013.01); *G09G 2310/08* (2013.01); *G09G 2320/064* (2013.01); *G09G 2360/12* (2013.01)

(58) Field of Classification Search
CPC .... G09G 3/2085; G09G 3/32; G09G 2310/08; G09G 2320/064; G09G 2360/12; G09G 3/2003; G09G 3/2014; G09G 3/2022; G09G 3/2011; G09G 3/3233; G09G 3/3216; G09G 3/3648; G09G 3/3208; G09G 3/3291; H01L 27/1218; H01L 21/77
See application file for complete search history.

(56) References Cited

U.S. PATENT DOCUMENTS

| | | | | |
|---|---|---|---|---|
| 9,829,710 | B1 | 11/2017 | Newell et al. | |
| 9,905,159 | B2 | 2/2018 | Genoe | |
| 10,319,278 | B1 * | 6/2019 | Nho | G09G 3/2003 |
| 10,978,022 | B2 | 4/2021 | Chaji et al. | |

(Continued)

FOREIGN PATENT DOCUMENTS

JP 2018019276 A 2/2018

OTHER PUBLICATIONS

Goto Masahide et al., Triple-Layering Technology for Pixel-Parallel CMOS Image Sensors Developed by Hybrid Bonding of SOI Wafers, 2019 International 3D Systems Integration Conference (3DIC), IEEE, DOI: 10.1109/3DIC48104.2019.9058785.

(Continued)

*Primary Examiner* — Richard J Hong
(74) *Attorney, Agent, or Firm* — Potomac Technology Law, LLC

(57) ABSTRACT

A display system is provided that comprises a display panel having a plurality of pixel arrangement. Each pixel arrangement comprises at least one light emitting unit, at least one driver circuit operably coupled to the light emitting unit, and at least one digital counter operably coupled to the driver circuit. In this regard, the digital counter is configured to store a data value to be counted and to toggle a state of the driver circuit upon expiry, thereby toggling a state of the light emitting unit to perform luminance control of the pixel arrangement.

16 Claims, 9 Drawing Sheets

800A

(56) References Cited

U.S. PATENT DOCUMENTS

| | | | | |
|---|---|---|---|---|
| 2005/0237001 | A1* | 10/2005 | Hayafuji | G09G 3/3233 315/169.2 |
| 2007/0046611 | A1* | 3/2007 | Routley | G09G 3/3216 345/98 |
| 2007/0263016 | A1* | 11/2007 | Naugler | G09G 3/3291 345/690 |
| 2009/0303161 | A1* | 12/2009 | Messmer | G09G 3/2011 345/55 |
| 2016/0343771 | A1* | 11/2016 | Bower | H01L 21/77 |
| 2017/0061867 | A1* | 3/2017 | Cok | G09G 3/2022 |
| 2017/0186356 | A1* | 6/2017 | Cok | G09G 3/32 |
| 2017/0330509 | A1* | 11/2017 | Cok | G09G 3/2014 |
| 2018/0197471 | A1* | 7/2018 | Rotzoll | G09G 3/2003 |
| 2018/0342191 | A1* | 11/2018 | Cok | G09G 3/32 |
| 2019/0279552 | A1* | 9/2019 | Shaeffer | G09G 3/2014 |
| 2019/0347980 | A1* | 11/2019 | Kuo | G09G 3/32 |
| 2020/0259048 | A1* | 8/2020 | Or-Bach | H01L 27/1218 |
| 2020/0286424 | A1 | 9/2020 | Thielemans et al. | |
| 2021/0118353 | A1 | 4/2021 | Sakariya et al. | |
| 2021/0225283 | A1 | 7/2021 | Lin et al. | |
| 2021/0304682 | A1* | 9/2021 | Wang | G09G 3/2014 |
| 2023/0013734 | A1* | 1/2023 | Vahid Far | G09G 3/3208 |
| 2023/0016573 | A1* | 1/2023 | Goetz | G09G 3/3648 |

OTHER PUBLICATIONS

Alexander Goettker et al., Differences between oculomotor and perceptual artifacts for temporally limited head mounted displays, Paper 19-1, Distinguished Paper at Display Week 2020, Journal of the Society for Information Display (JSID), DOI: https://doi.org/10.1002/jsid.912.

* cited by examiner

DISPLAY SYSTEM WITH GLOBAL EMISSION AND METHOD FOR LUMINANCE CONTROL THEREOF

PRIORITY

This application claims priority of European Patent Application EP21213331.8 filed on Dec. 9, 2021, the entirety of which is incorporated herein by reference.

FIELD OF THE INVENTION

The invention relates to a display system and a method for luminance control of said display system, and particularly to a display system with global emission without scanning.

BACKGROUND

Generally, conventional display systems rely on scanning or rasterization to render an incoming video or image. Therein, scanning is performed by sharing the display hardware among display pixels at a fast pace. Conventional pixels are grouped into lines or rows and image rendering is performed for a row followed by a switch to the next row where the subsequent rendering is performed, and eventually reaches the last row of pixels. A row of pixels receives its corresponding video data followed by the next row of pixels, and so on.

Usually, the rendering hardware includes, for example, row decoder, column decoder, pixel driver, storage element, luminance control, and the like. Most of these hardware are shared (e.g. multiplexed) among the rows of pixels, especially to reduce the overall hardware cost and size. However, sharing or multiplexing of hardware limits the overall speed that can be achieved to address all pixels for a display frame, and the hardware sharing scheme requires additional processing power and causes more power consumption.

For example, US 2021/0118353 A1 presents emission control apparatuses and methods for controlling an emission of a display panel. In particular, US 2021/0118353 A1 discloses a display driver hardware circuit that includes row selection logic, column selection logic, and emission logic to select a number of rows and a number of columns in an emission group of said display panel.

Accordingly, there is a need to provide a display system and a method for luminance control thereof, which can address the aforementioned limitations.

SUMMARY

Embodiments of the present invention advantageously address the foregoing requirements and needs, as well as others, by providing a display system and a method for luminance control of a display system, such as a display system with global emission without scanning.

According to a first aspect of the invention, a display system is provided that comprises a display panel having a plurality of pixel arrangement. Each pixel arrangement comprises at least one light emitting unit, at least one driver circuit operably coupled to the light emitting unit, and at least one digital counter operably coupled to the driver circuit. In this regard, the digital counter is configured to store a data value to be counted and to toggle a state of the driver circuit upon expiry, thereby toggling a state of the light emitting unit to perform luminance control of the pixel arrangement.

Therefore, the invention proposes a globally emissive display that eliminates the necessity of scanning or rasterization for addressing the pixels of a display panel in a successive manner. Preferably, each pixel arrangement of the inventive display panel comprises a light emitting unit, a driver circuit operably coupled to the light emitting unit, and a digital counter operably coupled to the driver circuit. Thus, the hardware required for a pixel arrangement or a pixel to operate are allocated and embedded per pixel of said display panel in order to allow the pixels to operate independently, i.e. independent of other pixels. The proposed scheme also advantageously eliminates the necessity of multiplexing the pixel hardware for addressing or decoding, since the proposed pixel arrangements or pixels are able to operate independently.

Preferably, the data value corresponds to a respective frame data per pixel of a frame to be displayed and wherein each digital counter of the respective plurality of pixel arrangement is configured to store the respective frame data simultaneously. Advantageously, no additional or separate frame memory is required.

In addition, each digital counter of the respective plurality of pixel arrangement is configured to toggle the state of the respective driver circuit based on the respective frame data per pixel of the frame to be displayed. Hence, the driver circuit or the pixel driver circuit toggles at the time frame data requires for that particular pixel. However, the operation of loading, turning on pixels, and measuring time corresponding to frame data for the pixel are performed simultaneously.

Preferably, each of the plurality of pixel arrangement has a color depth of N-bit and wherein each digital counter of the respective plurality of pixel arrangement is an N-bit digital counter, where N is an integer. For instance, the color depth or bit depth to indicate the color of a single pixel or as the number of bits used for each color component of a single pixel can be of 14-bit, 16-bit, 18-bit, and so on, and the digital counter can be of 14-bit, 16-bit, 18-bit, and so on, respectively.

Preferably, each digital counter of the respective plurality of pixel arrangement is configured to operate on a clock signal having a clock frequency determined as a function of a frame rate of the frame to be displayed and the color depth of the respective plurality of pixel arrangement. In this regard, a segment of a number of pulses of the clock signal corresponds to a percentage luminance per frame data of the frame to be displayed.

Advantageously, the digital counter is implemented with a pulse width modulation (PWM) algorithm to implement a digital control of the pixel luminance. For instance, a 5-bit digital counter of a pixel arrangement that expires after 19 ticks out of 32 possible ticks of the clock signal results in a 19/31 percent luminance.

Preferably, the display system further comprises a content-addressable memory configured to provide the data value for each digital counter of the respective plurality of pixel arrangement, preferably simultaneously. Advantageously, high-speed search for the data of respective pixel arrangements, particularly for the respective digital counters, is facilitated.

For instance, the display system or a user of said display system or a further system may provide the content-addressable memory (CAM) a set of data. The CAM will then search through its contents to see if any data matches the data being provided. If matching data can be found, the CAM returns the address or addresses upon which the matching data was found.

Preferably, the light emitting unit comprises a red light emitting element and/or a green light emitting element and/or a blue light emitting element. Further preferably, the light emitting element or elements are light emitting diodes (LEDs), for instance, micro-LEDs, organic LEDs, and the likes. The display panel can be of a single color, i.e. a monochrome display die having a plurality of red or green or blue light emitting elements arranged in an array, where each light emitting element forms a pixel of said display panel. This may advantageously facilitate three monochrome displays, especially a display die emitting light of red color, a display die emitting light of green color, and a display die emitting light of blue color, where the lights of said three monochrome displays can be merged for example by waveguides to create a full-color display.

Alternatively, the light emitting unit may comprise at least one red light emitting element and at least one green light emitting element and at least one blue light emitting element. In this regard, the red, green and blue light emitting elements form a pixel of said display panel, i.e. an RGB display die, where each of the light emitting elements corresponds to an N-bit color depth associated with a respective driver circuit and a respective N-bit digital counter to operate, i.e. 3N-bit of data per pixel.

Preferably, the display panel comprises at least a first wafer and a second wafer, e.g. silicon wafers, whereby for each pixel arrangement, the light emitting unit is implemented on the first wafer and the driver circuit and the digital counter are implemented on the second wafer. In addition, the first wafer and the second wafer are stacked according to a three-dimensional (3D) integration scheme. Thus, the hardware required for a pixel to operate independently are embedded per pixel, particularly underneath the pixel on a separate silicon layer, e.g. implemented via complementary metal-oxide semiconductor (CMOS) fabrication process for very large-scale integration (VLSI) technology. Advantageously, each pixel is able to access the required hardware and is able to operate independently, whereby reducing the required area per pixel plane significantly. The presented scheme is particularly advantageous for high resolution and small size displays such as those for augmented reality (AR) or virtual reality (VR) applications.

Alternatively, each digital counter of the respective plurality of pixel arrangement comprises a number of M symmetrically stacked digital counters, where M is an integer. Furthermore, for each pixel arrangement, the driver circuit and the number of M symmetrically stacked digital counters are implemented on a respective number of M wafers, e.g. silicon wafers. In this regard, the number of M wafers are stacked according to a three-dimensional (3D) integration scheme.

For instance, a 16-bit digital counter may be implemented from two 8-bit symmetrically stacked digital counters. In this case, the display panel may comprise three separate layers, i.e. a number of M+1 layers. For each pixel arrangement, the light emitting unit may be implemented in the first layer to form a pixel, and the respective 8-bit digital counters, along with the driver circuit, may be implemented in the respective second layer and third layer underneath the pixel by means of 3D stacking, e.g. using Through Silicon Vias. Accordingly, the hardware required for a pixel to operate independently are embedded per pixel, e.g. implemented via CMOS-VLSI technology, which significantly reduces the required area per pixel plane.

According to a second aspect of the invention, a method is provided for performing luminance control of a display system comprising a display panel having a plurality of pixel arrangement, where each pixel arrangement comprises at least one light emitting unit, at least one driver circuit operably coupled to the light emitting unit, and at least one digital counter operably coupled to the driver circuit. The method comprises the steps of storing a data value to be counted in the digital counter, toggling a state of the driver circuit upon the digital counter expires, and toggling a state of the light emitting unit to perform luminance control of the pixel arrangement.

Preferably, the data value corresponds to a respective frame data per pixel of a frame to be displayed and the method further comprises a step of storing the respective frame data at each digital counter of the respective plurality of pixel arrangement simultaneously.

Preferably, the method further comprises a step of toggling, by each digital counter of the respective plurality of pixel arrangement, the state of the respective driver circuit based on the respective frame data per pixel of the frame to be displayed.

Preferably, the method further comprises a step of providing a clock signal for each digital counter of the respective plurality of pixel arrangement having a clock frequency determined as a function of a frame rate of the frame to be displayed and a color depth of the respective plurality of pixel arrangement.

Preferably, the method further comprises a step of providing, by a content-addressable memory, the data value for each digital counter of the respective plurality of pixel arrangement, preferably simultaneously.

It is to be noted that the method according to the second aspect corresponds to the display system according to the first aspect and its implementation forms. Accordingly, the method of the second aspect achieves the same advantages and effects as the display system of the first aspect and its respective implementation forms, and vice versa.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Exemplary embodiments of the invention are now further explained with respect to the drawings by way of example only, and not for limitation. In the drawings.

DETAILED DESCRIPTION

A display system and a method for luminance control of a display system, such as a display system with global emission without scanning, are provided. In the following description, for the purposes of explanation, numerous specific details are set forth in order to provide a thorough understanding of the invention. It is apparent, however, that the invention may be practiced without these specific details or with an equivalent arrangement. In other instances, well-known structures and devices are shown in block diagram form in order to avoid unnecessarily obscuring the invention.

Reference will now be made in detail to the embodiments of the present invention, examples of which are illustrated in the accompanying drawings. However, the following embodiments of the present invention may be variously modified and the range of the present invention is not limited by the following embodiments.

Figure 1:
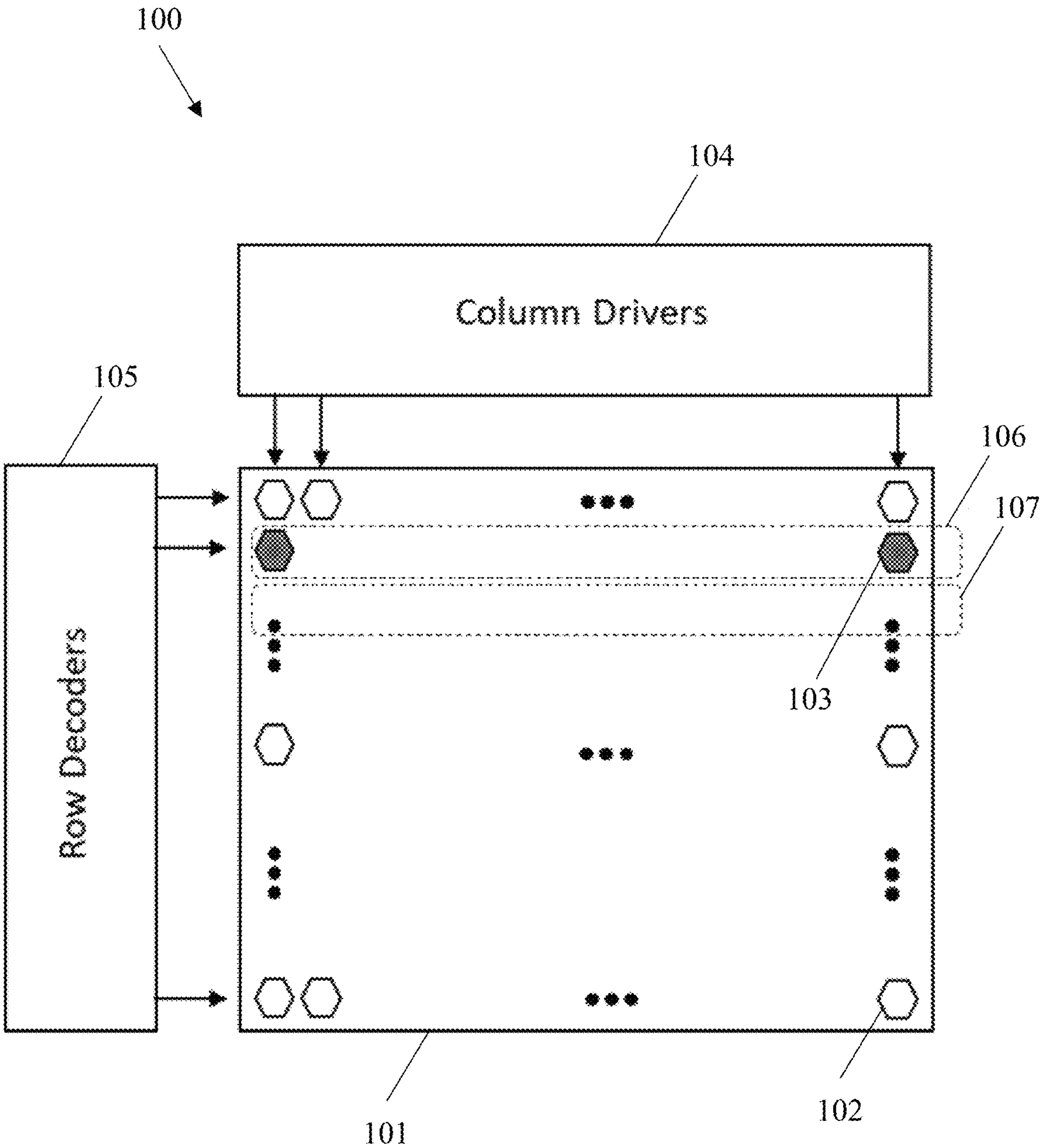
FIG. 1 shows a conventional display with scanning mechanism.

In FIG. 1, a conventional display 100 with scanning mechanism is illustrated. The display 100 may comprise a display panel 101 having a plurality of pixels 102,103 arranged in a two-dimensional array, for example. In order to address the pixels 102,103, the display 100 may comprise column derivers 104 and row decoders 105. Generally, the column drivers 104 may address a column of pixels or multiple columns of pixels of the two-dimensional array of pixels. Similarly, the row decoders 105 may address a row of pixels of the two-dimensional array of pixels. Ideally, the column drivers 104 and the row decoders 105 are multiplexed so as to address the two-dimensional array of pixels, especially to achieve a row-by-row scanning of the pixels 102,103.

Generally, a frame to be displayed is stored in a separate frame memory (not shown), especially implemented external to the display 100, and the two-dimensional array of pixels are processed for the frame in a row-by-row processing. For instance, the multiplexed operation of the column drivers 104 and the row decoders 105 may process the second row of pixels 106, performs the luminance control of respective pixels based on the frame data, e.g. pixel 103 of second row of pixel 106, and upon completion, it proceeds to the third row of pixels 107. Upon processing the entire display panel 101 for one frame, the next frame generally starts by processing from the first row of the two-dimensional array of pixels.

The multiplexed operation is advantageous in terms of the overall hardware cost and size, however, limits the overall speed that can be achieved to address all pixels for one frame. In addition, the sharing or multiplexing has implications for image quality. For example, some effects such as ghosting or flickering are particularly present due to multiplexing and the subsequent scanning operation. Moreover, the multiplexed operation requires complex timing and decoding, and further limits luminance control of the pixels.

Generally, the luminance control scheme for pixels of a display may correspond to an analog implementation or a digital implementation. In the analog implementation, for example, the magnitude of current through the pixels is varied. In the digital implementation, the current is kept constant but the on time of pixels is varied. For displays with high color depth, analog implementations are not suitable due to the difficulties associated with the assignment of currents with high accuracy, and therefore digital implementations are preferred. However, said digital implementations become complicated due to the conventional scanning schemes, particularly for high resolution displays, e.g. Full High Definition (FHD), Ultra High Definition (UHD) displays, and so on. This is because the large amount of digital data that are to be processed onto pixels requires complex encoding schemes such as dual scanning schemes, e.g. scanning for light and erase.

Figure 2:
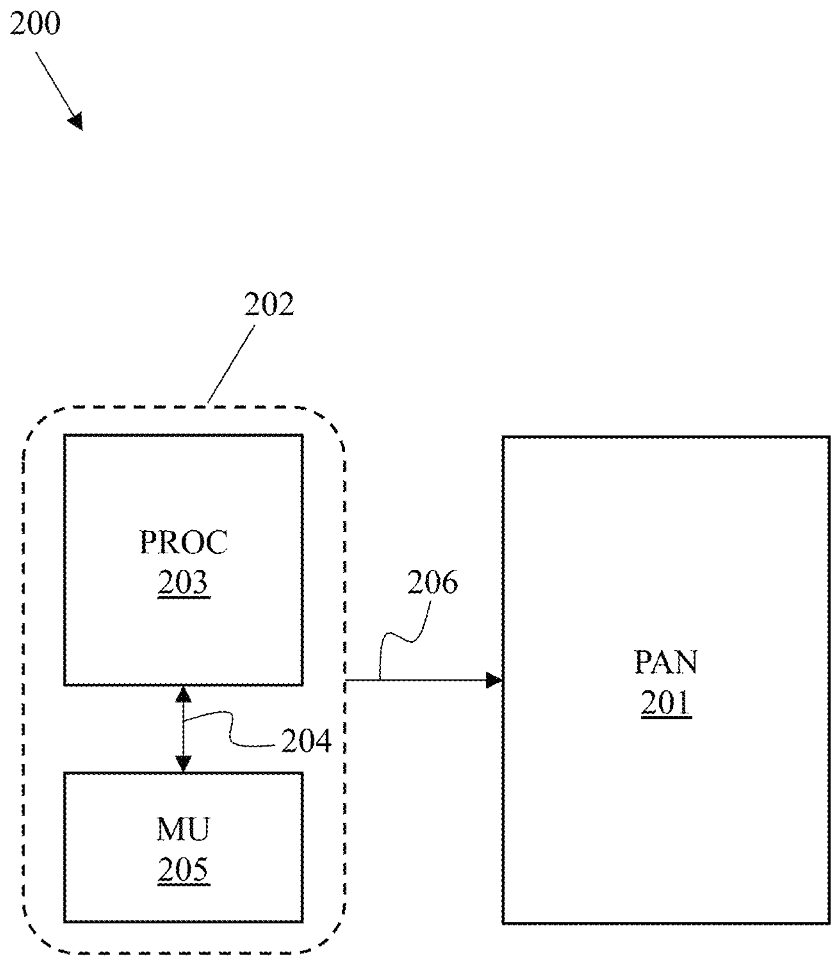
FIG. 2 shows an exemplary embodiment of the display system according to the first aspect of the invention.

In FIG. 2, an exemplary embodiment of the display system 200 according to the first aspect of the invention is illustrated. The display system 200 comprises a display panel 201 and a processing unit or a projection unit 202, operably coupled to the display panel 201, preferably via wire connection 206. If the coupling is based on the wire connection 206, the display panel 201 and the processing unit 202 may comprise a respective connector, e.g. a flex-connector, to accommodate the wire connection or coupling 206.

The processing unit 202 preferably comprises a processing module or processor 203 and a memory unit 205, operably coupled to the processing module 203, resp. the display panel 201. Preferably, the processing module 203 and the memory unit 205 are coupled via a bi-directional coupling 204, e.g. a bi-directional wire connection 204.

The processing module 203 may be implemented by hardware, software, or any combination thereof. The processing module 203 may include one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

The memory unit 205 is preferably a content-addressable memory (CAM) or associative memory (AM) or storage. In this regard, the memory unit 205 may comprise an array of a plurality of CAM cells arranged in a plurality of rows and columns, e.g. in a two-dimensional array. For instance, a CAM cell may include a Static Random Access Memory (SRAM) cell in addition to a matching logic that is required to indicate whether or not this cell has matched a provided data, e.g. provided by a user of the display system 200.

The display panel 201, hereinafter referred to as a display, comprises a plurality of pixel arrangements, hereinafter referred to as pixels, where the internal arrangement of said pixels will be described along FIG. 3 in detail.

Figure 3:
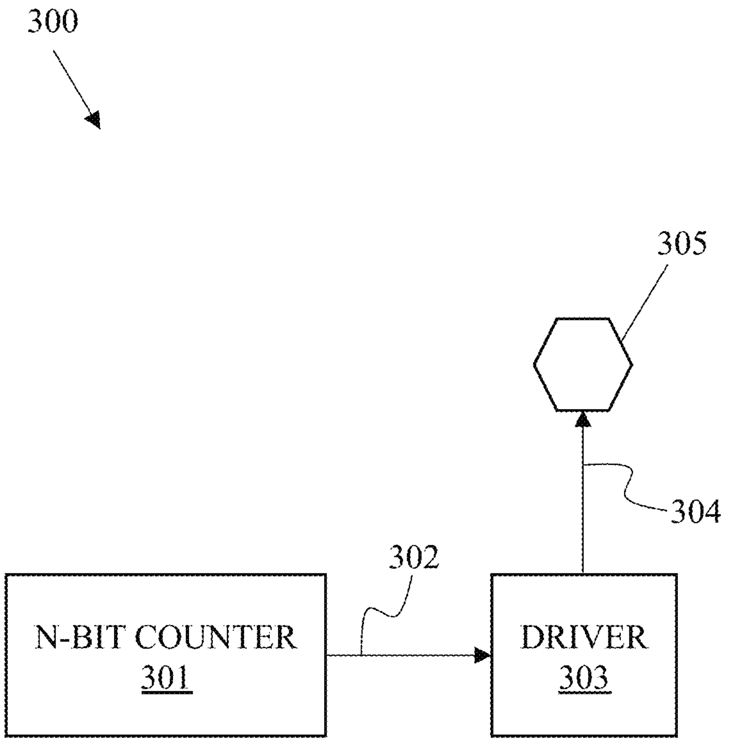
FIG. 3 shows an exemplary pixel arrangement of the display system.

In FIG. 3, an exemplary arrangement for a pixel 300 of the display panel 201 of the display system 200 is illustrated. The pixel 300 comprises an N-bit digital counter 301 operably coupled to a driver circuit 303. The number of bits N is defined by the color depth of the pixel 300 resp. of the display 201. The pixel 300 further comprises a light emitting unit 305, for instance a light emitting diode (LED). The driver circuit 303 is operably coupled, e.g. via a coupling path 304, to said light emitting unit 305.

In this regard, the digital counter 301 may store a data value or frame data per pixel corresponding to a frame to be displayed on the display 201, e.g. frame data is loaded to the digital counter 301 by means of the memory unit 205. The digital counter 301 may comprise a number of N flip-flops, each can store 1-bit of data, resulting in an N-bit storage for the frame data. The digital counter 301 then counts according to the data value and generates an expire signal 302 upon expiry. By means of the expire signal 302, the digital counter 301 drives the state of the driver circuit 303, e.g. switching the driver circuit 303 between an off state and an on state. A change in the state of the driver circuit 303 results in a change in the state of the light emitting unit 305, e.g. toggling the light emitting unit 305 between an off state and an on state via the coupling path 304.

The digital counter 301 is further provided with a clock signal having a clock frequency determined as a function of a frame rate of the frame to be displayed on the display 201 and the color depth of the pixel 300. The counting period or duration of the digital counter 301 results in a segment of a number of pulses of the clock signal that corresponds to a digital pulse width modulation scheme. Based on the segment of the number of pulses of the clock signal, the pulse width modulation scheme foresees a percentage luminance per frame data of the frame to be displayed, thereby performing luminance control of the pixel 300. Said pulse width modulation scheme will be described in detail in a later section of this disclosure.

Although not illustrated in FIG. 3, it is conceivable that the light emitting unit 305 may comprise one red light emitting element, one green light emitting element, and one blue light emitting element. Therefore, the red, green and blue light emitting elements form a pixel 300 of the display 201, i.e. an RGB display. In this context, each of the RGB light emitting elements corresponds to an N-bit color depth associated with a respective driver circuit 303 and a respective N-bit digital counter 301 to operate, i.e. 3N-bit of data per pixel 300.

Figure 4:
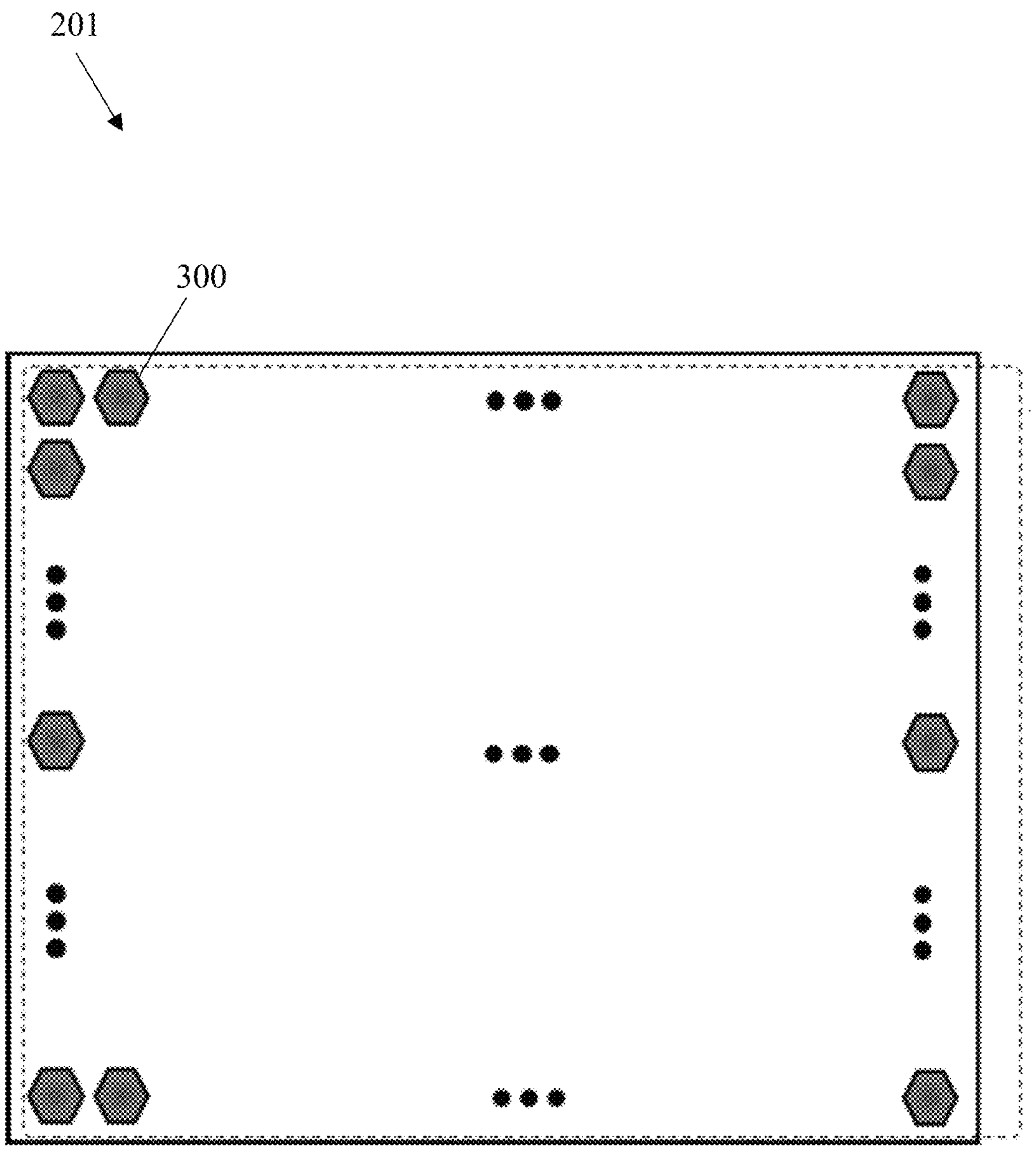
FIG. 4 shows an exemplary global emission scheme of the display system without row or column decoders.

In FIG. 4, an exemplary global emission scheme according to the display system 200 is illustrated. The display 201 comprises the plurality of pixels 300, for instance, in a two-dimensional array. However, due to the independent operation of the pixels 300, the pixels 300 are not required to be addressed in a row and a column fashion, which results in a globally emissive display 201 without scanning or rastering.

It can be seen that all pixels 300 of the display 201 are able to operate independently and further simultaneously based on the frame data per pixel of the frame to be displayed on the display 201. It can also be seen that, compared to the conventional display of FIG. 1, the globally emissive display 201 eliminates the necessity of having the row and column decoders and drivers, which facilitates a smaller area to be realized for the display 201 that is advantageous for AR or VR applications. As described before, each pixel 300 encapsulates the hardware required for decoding, driving, and digital luminance control of the pixel 300. The plurality of pixels 300 receives a respective data for the frame to be displayed, displays the data, e.g. in terms of percentage luminance, and then the data for the next frame is similarly loaded into them in parallel.

Figure 5:
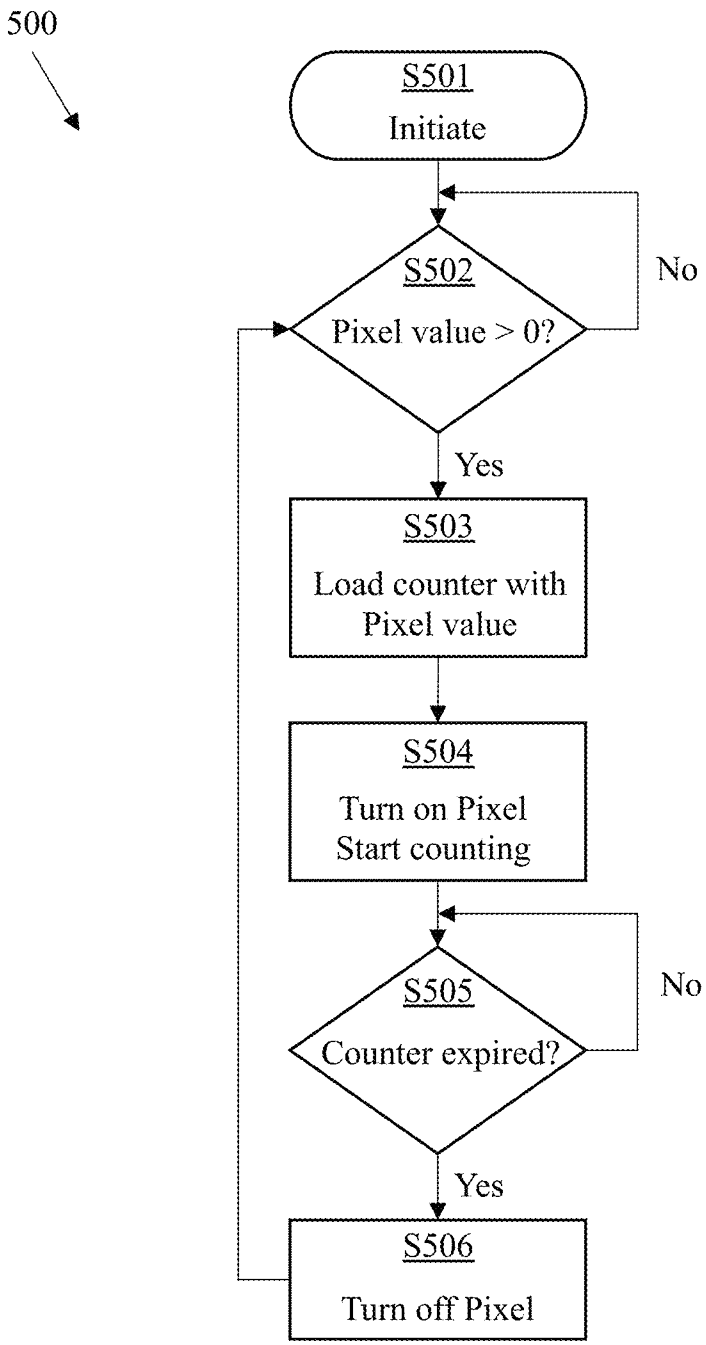
FIG. 5 shows an exemplary flow-chart of decision making for luminance control of the pixel arrangement.

In FIG. 5, an exemplary flow-chart 500 of decision making for luminance control of the pixel 300 is illustrated. The flow-chart 500 demonstrates the pulse width modulation algorithm that effectively and simultaneously performs digital control of the pixel luminance for all pixels 300 of the display 201. The following description of the algorithm corresponds to a per pixel implementation and is true for all pixels 301 and is performed simultaneously for all pixels 300 of the display 201.

The algorithm initiates at a step S501. In a next step S502, the algorithm performs a check on whether a pixel value or a frame data per pixel is zero or greater than zero. If the pixel value is not greater than zero, e.g., the value is zero; the algorithm reverts to the step S502. If the pixel value is greater than zero, the algorithm proceeds to a next step S503. In the step S503, the digital counter 301 is loaded with the pixel value, e.g. via CAM addressing. In a next step S504, the pixel 300, particularly the light emitting unit 305 is turned on, e.g. via the driver circuit 303, and the digital counter 301 starts counting. In other words, the digital counter 301 counts the duration or time for which the light emitting unit 305 shall remain in the on state.

In a next step S505, the algorithm performs a check on whether the digital counter 301 expires, e.g. the digital counter 301 generates the expire signal 302. If the digital counter 301 is not yet expired, the algorithm reverts to the step S505. If the digital counter 301 expires, the algorithm proceeds to a next step S506. In the step S506, the pixel 300, particularly the light emitting unit 305, is turned off, e.g. via the driver circuit 303. The algorithm also foresees that the pixel 300, particularly the light emitting unit 305, remains in the off state until next frame data arrives.

As it can be understood, the digital counter 301 along with the pulse width modulation algorithm described above implement a digital control of the pixel luminance. The digital counter 301 keeps counting until it reaches a value that sets the luminance dictated by the pixel data or frame data per pixel. When the pixel luminance is set to be non-zero, the pixel 300 is turned on and stays on for the duration of counting. When the digital counter 301 expires, the pixel 300 is turned off. This process is performed for all pixels 300 in parallel since the pixels 300 are able to operate independently. The presented scheme therefore eliminates the necessity for conventional scanning in order to set and to control pixel luminance.

Figure 6:
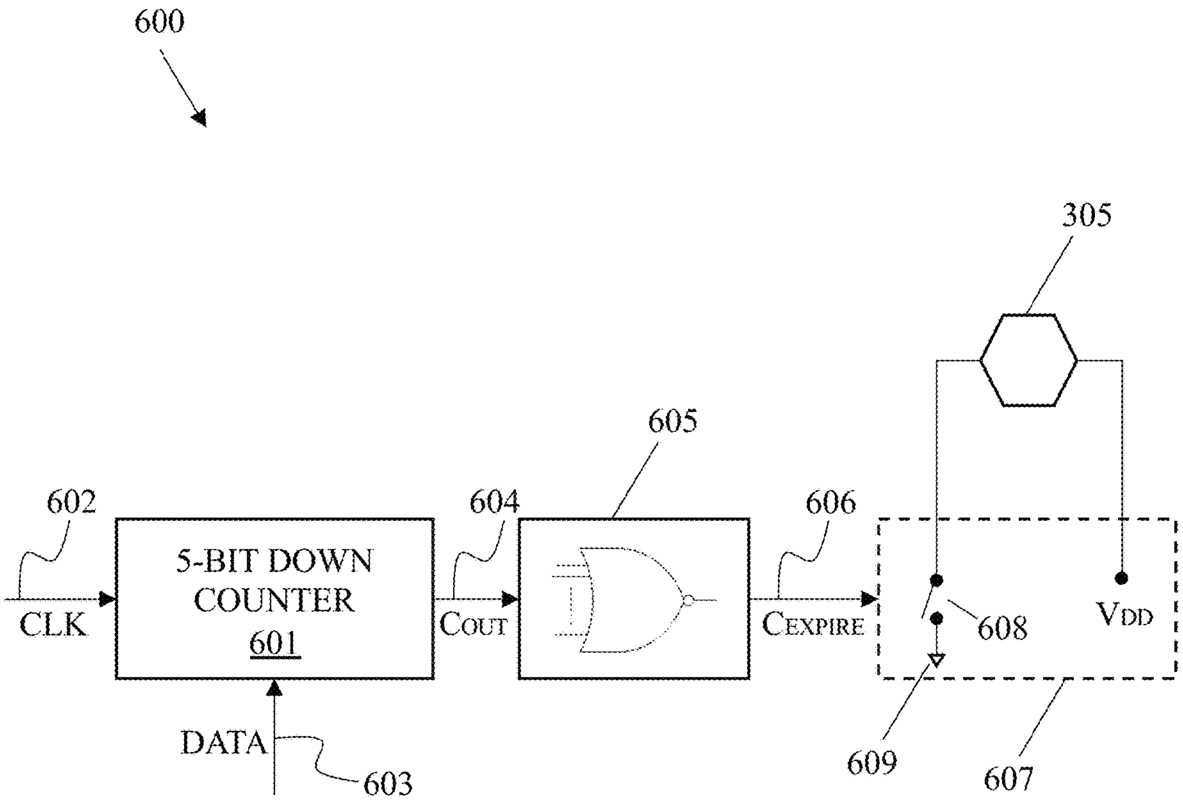
FIG. 6 shows an exemplary pixel arrangement of the display system in detail.

In FIG. 6, an exemplary arrangement for a pixel 600 of the display 201 of the display system 200 is illustrated in detail. The arrangement of the pixel 600 corresponds to the arrangement of the pixel 300, and can be analogously implemented, where the pixel 600 is illustrated for a 5-bit color depth scheme.

In this regard, the pixel 600 comprises a 5-bit digital counter 601. The digital counter 601 is provided with a clock signal 602 having a clock frequency as a function of the frame rate and the color depth. The digital counter 601 is further provided with a data line 603, e.g. coupled to the processing unit 202 resp. the memory unit 205, in order to load a pixel value or frame data per pixel onto the digital counter 601. The digital counter 601 is preferably implemented as a modulus down counter that comprises five flip-flops (not shown). Each of the flip-flops stores 1-bit of data, therefore providing a counting range of 0-31.

The digital counter 601 further comprises an output 604 that corresponds to the outputs of the flip-flops, which are coupled to a 5-input NOR logic 605 (or an N-input NOR logic gate in general). The output of the NOR logic results in an expire signal 606 when the counter expires or finishes the down counting of the loaded data, i.e. the outputs of the flip-flops are zero or active low and hence all inputs of the NOR logic are zero or active low.

The pixel further comprises a driver circuit 607 and a light emitting unit 305 mutually arranged so that the driver circuit 607 is able to drive a state of the light emitting unit 305, i.e. toggling the light emitting unit 305 between an on state and an off state. The driver circuit 607 may comprise a switching arrangement 608, or simply a switch, coupled to a ground potential 609. The switch 608 is further coupled to a reference potential $V_{DD}$ through the light emitting unit 605. In other words, the light emitting unit 305 is coupled between the reference potential $V_{DD}$ and the ground potential 609 through the switch 608. The digital counter 601, especially via the expire signal 606 generated from the OR logic 605, toggles the switch 608 of the driver circuit 607 between an on state and an off state, which consequently toggles the light emitting unit 305 between the on state and the off state, respectively.

Figure 7:
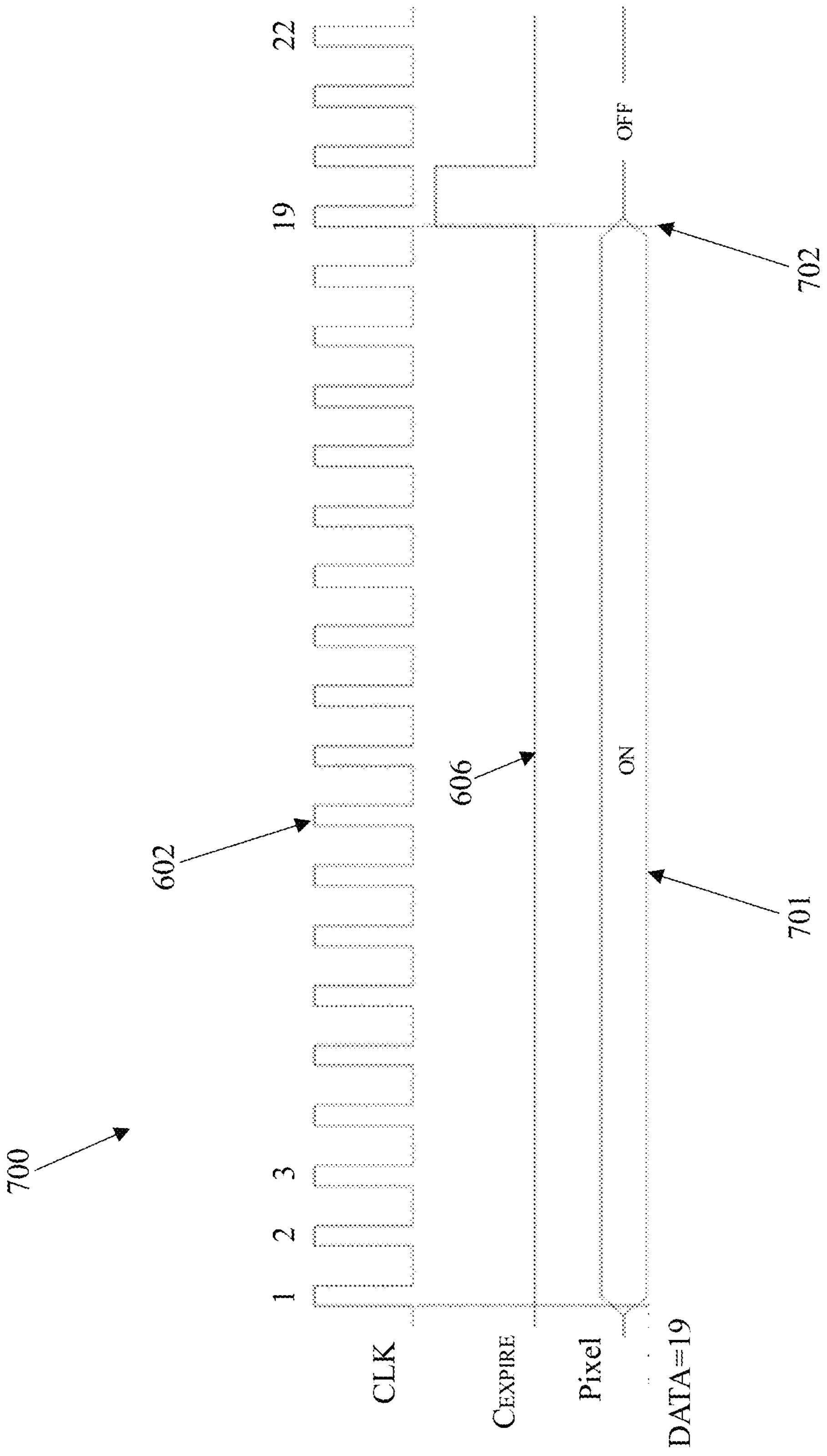
FIG. 7 shows an exemplary timing diagram for the pixel arrangement of FIG. 6.

In FIG. 7, an exemplary timing operation for the pixel 600 of FIG. 6 is illustrated. The timing diagram 700 illustrates the clock signal 602, the expire signal 606, the pixel value or data, and the state of the pixel 600, especially the state of the light emitting element 305.

The 5-bit digital counter 601 has a counting range of 0-31, i.e. 32 possible ticks of the clock signal 602. For instance, consider the digital counter 601 is loaded with a pixel value or data value of 19, i.e. the digital counter 601 is set to expire after 19 ticks of the clock signal 602. During the period of the counter operation, the pixel 600 remains in the on state 701. This is because the pixel value that is stored in the digital counter 601 is greater than zero, and thus for the duration of counter operation, at least one of the outputs of the flip-flops is non-zero. This sets the 5-input NOR logic output to active low, or 0, and the switch 608 of the driver circuit 607 remains closed.

However, when the digital counter 601 expires 702 at the 19 tick of the clock signal 602, the outputs of the flip-flops are all become zero, and the output of the NOR logic 605 sets the expire signal 606 to active high, or 1. The expire signal 606 accordingly opens the switch 608 of the driver circuit 607 and therefore switches off the pixel 600. Thus, in this example, the pixel 600 remains in the on state for 19 ticks out of 32 possible ticks of the clock signal 602, hence results in a 19/31 percent luminance. Therefore, the pixel luminance is accurately controlled with a fully digital and accurate pulse width modulation scheme.

It is to be understood that the above-mentioned arrangement, especially the arrangements for the digital counter 601 and its subsequent logic 605, is illustrated by way of an example. The invention is not limited to this exemplary arrangement and alternative arrangements known in the art to achieve the underlying technique are within the scope of the presented invention.

Figure 8A:
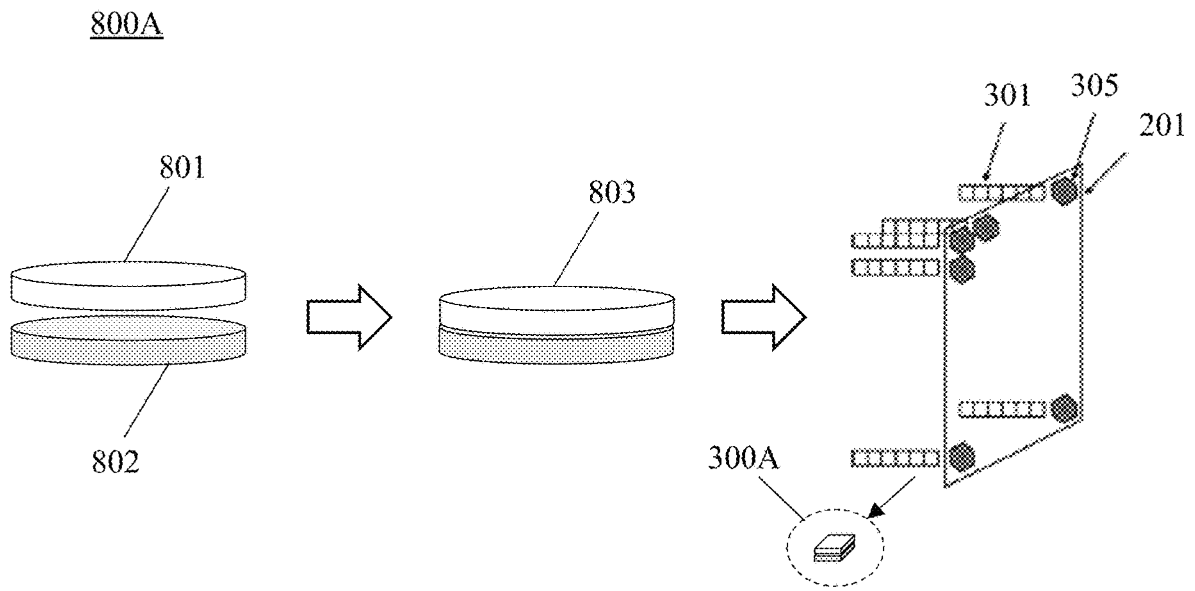
FIG. 8A shows a first exemplary embodiment of wafer-level implementation for a display panel of the display system.
Figure 8B:
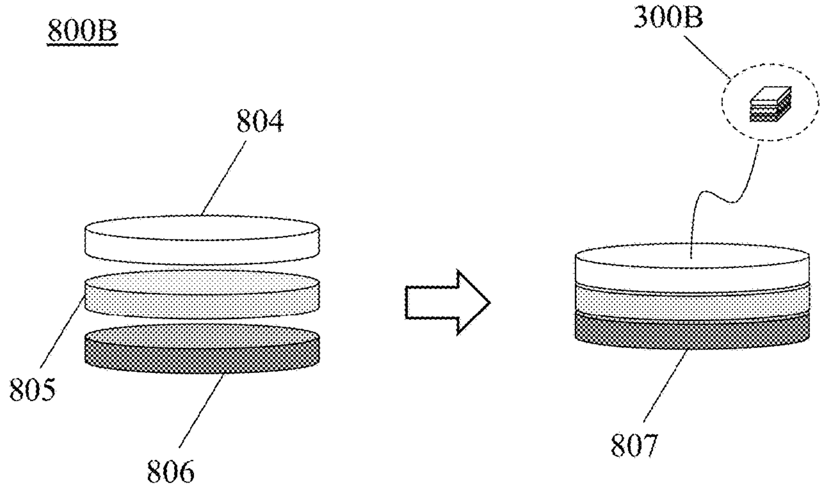
FIG. 8B shows a second exemplary embodiment of wafer-level implementation for a display panel of the display system.

Along FIG. 8A and FIG. 8B, exemplary embodiments of wafer-level implementations for the display 201 of the display system 200 are illustrated. In particular, FIG. 8A shows a first exemplary embodiment of wafer-level implementation 800A for the display 201 of the display system 200. The wafer-level implementation 800A corresponds to a three-dimensional (3D) integration scheme, e.g. a wafer-to-wafer 3D monolithic scheme using through-silicon vias for bonding, with either front-end of line (FOEL) process or back-end of line (BEOL) process.

The display 201 may comprise a first wafer 801, e.g. a silicon wafer, a sapphire wafer (Al2O3), and the like, on which the plurality of light emitting units 305, e.g. micro-LEDs, are realized. For each color of red, green and blue, the material for the light emitting unit 305 may be selected from different compound semiconductors. For instance, the light emitting unit 305 of red color may be fabricated with Aluminum Gallium Indium Phosphide (AlGaInP), the light emitting unit 305 of green color as well as the light emitting unit 305 of blue color may be fabricated with Indium Gallium Nitride (InGaN).

The display 201 may further comprise a second wafer 802, e.g. a silicon wafer (CMOS), on which the digital counters 301 and the driver circuits 303 of the respective plurality of light emitting units 305 are realized. The first wafer 801 and the second wafer 802 are then stacked 803 according to the 3D integration scheme, i.e. the wafers are sequentially aligned, bonded, thinned, and interconnected. This results in a pixel 300A having its respective luminance control hardware or circuit, i.e. the digital counter 301 and the driver circuit 303, underneath the pixel 300A in a separate silicon layer, preferably implemented in CMOS-VLSI technology.

As such, the pixel 300A is readily accessed and turned on or off via its respective luminance control hardware without requiring a large area per pixel plane, i.e. no planar waste or dead area. Accordingly, the pixel 300A is able to receive, store, and set its luminance independent of other pixels.

FIG. 8B shows a second exemplary embodiment of wafer-level implementation 800B for the display 201 of the display system 200. The wafer-level implementation 800B corresponds to a three-dimensional (3D) integration scheme, e.g. a wafer-to-wafer 3D monolithic scheme using through-silicon vias for bonding, with either front-end of line (FOEL) process or back-end of line (BEOL) process.

The display 201 may comprise a first wafer 804, e.g. a silicon wafer, a sapphire wafer (Al2O3), and the like, on which the plurality of light emitting units 305, e.g. micro-LEDs, are realized. For each color of red, green and blue, the material for the light emitting unit 305 may be selected from different compound semiconductors. For instance, the light emitting unit 305 of red color may be fabricated with Aluminum Gallium Indium Phosphide (AlGaInP), the light emitting unit 305 of green color as well as the light emitting unit 305 of blue color may be fabricated with Indium Gallium Nitride (InGaN).

The display 201 may further comprise a second wafer 805 and a third wafer 806, e.g. a silicon wafer (CMOS), on which the digital counters 301 and the driver circuits 303 of the respective plurality of light emitting units 305 are realized. The digital counter 301 is therefore realized by means of two symmetrically stacked digital counters, each of which is respectively realized on the second wafer 805 and the third wafer 806. For instance, a 16-bit digital counter can be implemented from two 8-bit symmetrically stacked digital counters.

Accordingly, the first wafer 804, the second wafer 805, and the third wafer 806 are then stacked 807 as per the 3D integration scheme, i.e. the wafers are sequentially aligned, bonded, thinned, and interconnected. This results in a pixel 300B having its respective luminance control hardware or circuit, i.e. the digital counter 301 and the driver circuit 303, underneath the pixel 300B in a separate silicon layer, preferably implemented in CMOS-VLSI technology. This technique is particularly suitable for older CMOS-VLSI technologies because 3D stacking of the symmetrically stacked digital counters occupies less planer area.

Although only three wafers are exemplified herein, it is to be understood that the underlying technique is applicable for more number of wafers or layers, e.g. a number of M+1 wafers with one wafer for realizing the plurality of light emitting units 305 and a number of M wafers dedicated to M symmetrically stacked digital counters with respect to each of the plurality of light emitting units 305.

Figure 9:
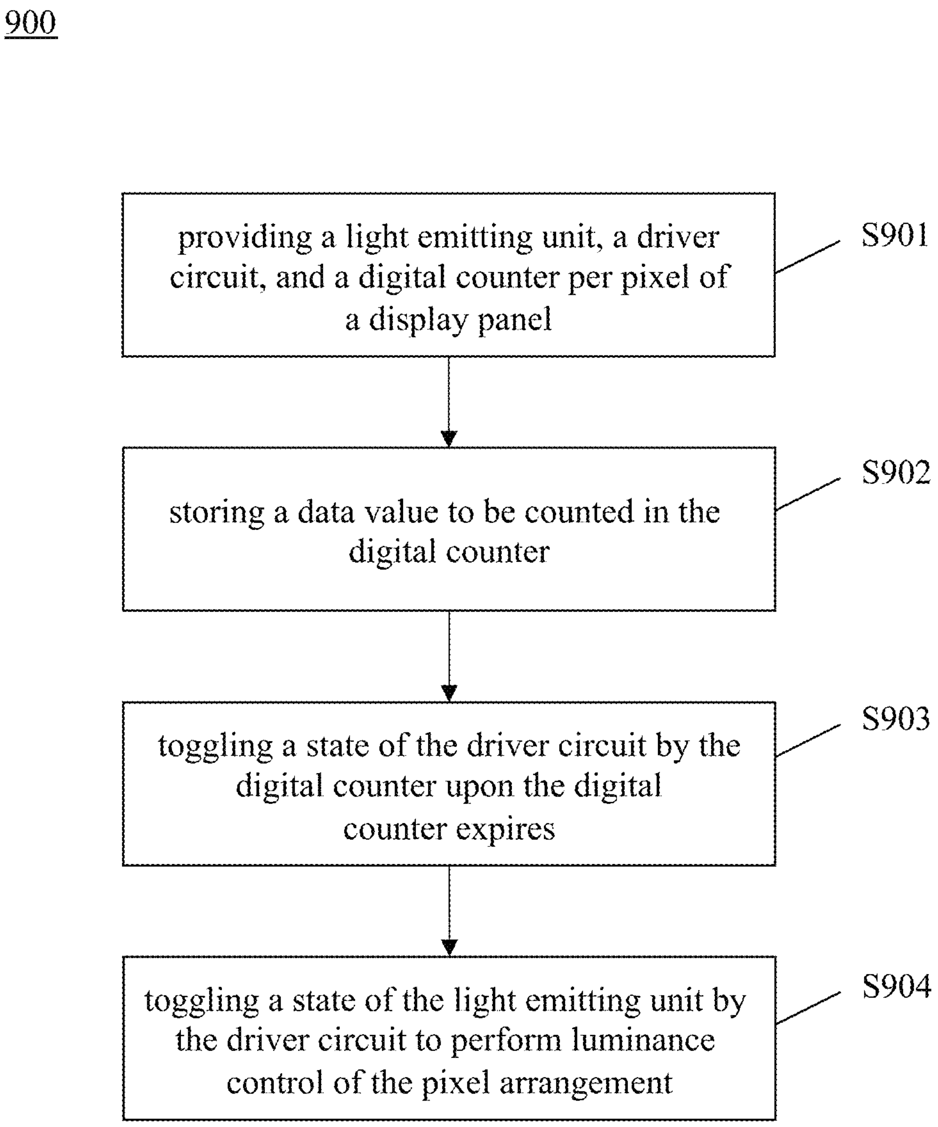
FIG. 9 shows an exemplary embodiment of the method according to the second aspect of the invention.

In FIG. 9, an exemplary embodiment of the method 900 according to the second aspect of the invention is illustrated. In a first step S901, a light emitting unit, a driver circuit, and a digital counter are provided per pixel of a display panel. In a second step S902, a data value to be counted is stored in the digital counter. In a third step S903, a state of the driver circuit is toggled by the digital counter upon the digital counter expires. Finally, in a fourth step S904, a state of the light emitting unit is accordingly toggled by the driver circuit. The second step S902, the third step S903, and the fourth step S904 are performed per pixel for each of the pixels of the display panel in order to perform luminance control of the respective pixels.

The presented solution eliminates the necessity for scanning or rendering, therefore eliminates the associated rendering artifacts such as flickering and ghosting. The presented solution further eliminates the necessity of multiplexing of hardware for addressing the pixels, therefore overcomes the power constrains associated with said multiplexing. Since the conventional scanning scheme is completely avoided, the presented solution eliminates the necessity of having a memory element (e.g. latch or capacitor) in the pixel circuitry to retain its luminance used in conventional scanning schemes, and the pixels are not required to hold their data between scans.

It is important to note that, in the description as well as in the claims, the word "comprising" does not exclude other elements or steps and the indefinite article "a" or "an" does not exclude a plurality. A single element or other unit may fulfill the functions of several entities or items recited in the claims. Moreover, the description with regard to any of the aspects is also relevant with regard to the other aspects of the invention.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A display system comprising:

a display panel having a plurality of pixel arrangements, and;

a memory unit operably coupled to the plurality of pixel arrangements and disposed external to the display panel; and wherein each pixel arrangement comprises:

at least one light emitting unit;

at least one driver circuit operably coupled to the light emitting unit; and a digital counter circuit operably coupled to the at least one driver circuit; and wherein the memory unit is configured to load a data value to the digital counter circuit of each pixel arrangement, wherein the data value corresponds to respective frame data per pixel of a frame to be displayed, wherein the digital counter circuit of each pixel arrangement is configured to store the data value, to perform a counting down of the stored data value, and to toggle a state of the at least one driver circuit upon expiry of the digital counter circuit, thereby toggling a state of the light emitting unit to perform luminance control of the pixel arrangement, and wherein the digital counter circuit of each pixel arrangement comprises a number of M digital counters, where M is an integer, and wherein when M>1 the M digital counters are symmetrically stacked.

2. The display system according to claim 1, wherein the digital counter circuits are configured to store the data value simultaneously.

3. The display system according to claim 2, wherein the digital counter circuit of each pixel arrangement is configured to toggle the state of the respective at least one driver circuit based on the respective frame data per pixel of the frame to be displayed.

4. The display system according to claim 1, wherein each pixel arrangement has a color depth of N-bits and wherein the digital counter circuit of each pixel arrangement is a N-bit digital counter, where N is an integer, and wherein the digital counter circuits of the pixel arrangements are configured to perform the counting down of the respective stored data values simultaneously.

5. The display system according to claim 4, wherein the digital counter circuit of each pixel arrangement is configured to operate on a clock signal having a frequency determined as a function of a frame rate of the frame to be displayed and the color depth of the respective pixel arrangement.

6. The display system according to claim 5, wherein a segment of a number of pulses of the clock signal corresponds to a percentage luminance for the respective frame data of the frame to be displayed.

7. The display system according to claim 1, wherein the memory unit comprises a content-addressable memory configured to provide the respective data value to the digital counter circuit of the respective pixel arrangement simultaneously.

8. The display system according to claim 1, wherein the light emitting unit comprises a red light emitting element and/or a green light emitting element and/or a blue light emitting element.

9. The display system according to claim 1, wherein the display panel comprises at least a first wafer and a second wafer, whereby for each pixel arrangement, the light emitting unit is implemented on the first wafer and the at least one driver circuit and the digital counter circuit are implemented on the second wafer, and wherein the first wafer and the second wafer are stacked according to a three-dimensional integration scheme.

10. The display system according to claim 1, wherein:

for each pixel arrangement, the at least one driver circuit and the M digital counters are implemented on a respective number of M wafers, wherein the at least one light emitting unit is on a separate wafer from the M wafers with the digital counters and the at least one driver circuit, such that when M>1 there are M+1 wafers, and the separate wafer with the at least one light emitting unit and the M wafers with the digital counters and at least one driver circuit are stacked according to a three-dimensional integration scheme.

11. A method for performing luminance control of a display system, the method comprising:

loading a data value into a digital counter of each of a plurality of pixel arrangements of a display panel of the display system from a memory unit disposed external to the display panel, wherein the digital counter circuit of each pixel arrangement comprises a number of M digital counters, where M is an integer, and wherein when M>1 the M digital counters are symmetrically stacked;

storing the data value in the digital counter of each pixel arrangement, wherein the data value corresponds to respective frame data per pixel for a frame to be displayed;

performing a counting down of the stored data value by each digital counter;

toggling a state of a driver circuit of each pixel arrangement upon expiry of the respective digital counter; and toggling a state of a light emitting unit of each pixel arrangement, based on the state of the respective driver circuit, to perform luminance control of the pixel arrangement.

12. The method according to claim 11, wherein the storing of the data value in the digital counters occurs simultaneously.

13. The method according to claim 12, wherein the toggling of the state of the driver circuit of each pixel arrangement is based on the respective frame data per pixel of the frame to be displayed.

14. The method according to claim 11, wherein the digital counter of each pixel arrangement operates based on a clock signal having a frequency determined as a function of a frame rate of the frame to be displayed and a color depth of the respective pixel arrangement.

15. The method according to claim 11, wherein the memory unit comprises a content-addressable memory, which provides the data value to the digital counter of each pixel arrangement simultaneously.

16. The method according to claim 11, wherein, when the digital counter circuit of each pixel arrangement is an N-bit counter implemented as M stacked wafers, each N-bit counter is split into M counters each of K bits and N=M*K.

* * * * *